United States Patent [19]

Carnahan et al.

[11] Patent Number: 4,919,814

[45] Date of Patent: Apr. 24, 1990

[54] SYSTEM AND METHOD FOR TREATING WASTEWATER COLLECTED FROM SEPTIC TANKS AND SIMILAR INSTALLATION

[75] Inventors: Robert P. Carnahan; Robert J. Murphy, both of Temple Terrace, Fla.

[73] Assignee: Hydro Systems, Inc., Tampa, Fla.

[21] Appl. No.: 337,264

[22] Filed: Apr. 13, 1989

[51] Int. Cl.$^5$ .............................................. B01D 3/30
[52] U.S. Cl. ..................... 210/603; 210/605; 210/620; 210/150; 210/221.2; 210/916; 210/631; 261/23.1; 261/122; 423/224
[58] Field of Search ............... 210/603, 605, 620, 754, 210/758, 916, 221.2, 150, 631; 261/23.1, 122; 423/224

[56] References Cited

U.S. PATENT DOCUMENTS

| | | | |
|---|---|---|---|
| 691,365 | 1/1902 | Dittler | 210/605 |
| 3,202,285 | 8/1965 | Williams | 210/605 |
| 3,335,082 | 8/1967 | Ulbrick | 210/916 |
| 3,875,051 | 4/1975 | Kovarik et al. | 210/605 |
| 3,914,164 | 10/1975 | Clark | 210/605 |
| 4,663,089 | 5/1987 | Lowry et al. | 261/122 |
| 4,696,739 | 9/1987 | Pedneault | 210/221.2 |
| 4,806,148 | 2/1989 | Ottengraf | 210/916 |
| 4,824,572 | 4/1989 | Scott | 210/754 |

FOREIGN PATENT DOCUMENTS 3419139 11/1985 Fed. Rep. of Germany .
53-93170 8/1978 Japan .
54-128160 10/1979 Japan .

Primary Examiner—Peter Hruskoci
Assistant Examiner—Christopher Upton
Attorney, Agent, or Firm—Duckworth, Allen, Dyer & Doppelt

[57] ABSTRACT

A system and method for treating "septage" (i.e., wastewater collected from septic tanks and similar installations) utilizes a reactor tank for treating the anaerobic wastewater with an oxygen-containing fluid so as to substantially increase the dissolved oxygen content and thereby render the wastewater aerobic and suitable for input into a municipal wastewater treatment facility. Volatile gases are drawn off from all of the reactor tanks and placed into a treatment tank for a reduction of the bacterial and odor levels by reaction with a chlorine-containing water output of the municipal wastewater treatment facility.

13 Claims, 3 Drawing Sheets

SYSTEM AND METHOD FOR TREATING WASTEWATER COLLECTED FROM SEPTIC TANKS AND SIMILAR INSTALLATION

BACKGROUND OF THE INVENTION

1. Field of the Invention

The present invention is directed to a system and a related method for the treatment of anaerobic septage collected from septic tanks and similar installations, and transforming that anaerobic wastewater into an aerobic condition so as to be conducive to biochemical treatment in a conventional wastewater treatment system.

2. Description of the Prior Art

Underground septic tanks are used extensively throughout the United States. Septic tanks require periodic cleaning and pumping at which time on the order of between 600 to 1,000 gallons of concentrated wastewater (referred to as "septage") is collected in a tanker truck. The manner in which the concentrated septage is disposed of varies significantly depending upon local ordinances and restrictions. In many areas, discharge into a conventional municipal wastewater treatment plant is either the required or at least preferred method of disposal. However, because septic tank septage is most often in an anaerobic condition, then the discharge of this concentrated wastewater into a conventional aerobic municipal wastewater treatment facility will either deteriorate the efficiency of that facility, or in some cases will even cause failure of the entire treatment system.

SUMMARY OF THE INVENTION

It is the purpose of the present invention to provide a system and method which is preferably located adjacent a conventional aerobic municipal wastewater treatment facility, for pretreating highly anaerobic septage obtained from septic tanks and similar installations, and rendering that septage in an aerobic condition which is suitable for discharge into the headwaters of the conventional aerobic wastewater treatment facility.

It is a further purpose of the present invention to provide a system and method which will achieve the objective noted above, while at the same time treating the volatile gases, particularly hydrogen sulfide, which are prevalent in anaerobic septage.

To achieve these purposes, the method of the present invention comprises the steps of placing the anaerobic wastewater into a reactor tank, and treating that anaerobic wastewater with an oxygen-containing fluid so as to substantially increase the dissolved oxygen content in the wastewater and thereby render the wastewater in a generally aerobic condition. At the same time, volatile gases are drawn off from the reactor tank and placed into a treatment tank, and then treated to reduce the bacterial and odor levels in those gases. The converted aerobic wastewater is then pumped into the head end of a conventional aerobic wastewater treatment facility.

In a preferred form, the treatment step for the volatile gases includes the utilization of a chlorinated water output of the municipal wastewater facility, which is reacted with the volatile gases to reduce the hydrogen sulfide content. That water is then reinjected into the head end of the municipal wastewater facility.

In order to increase the efficiency of the oxygenation process, the septage may be initially comminuted before being pumped into the reactor tank. Once pumped into the reactor tank, it is preferred that the oxygen treatment step continue until the oxygen content for the anaerobic wastewater is raised to a level on the order of about 2 milligrams per liter. In order to achieve this, the septage is sequentially pumped through a series of reactor tanks, with the oxygen-containing fluid being bubbled upwardly through the septage in each tank so as to achieve the desired oxygen-containing level. To further facilitate the oxygenation process, the oxygen-containing fluid is diffused through a gas membrane.

The system in accordance with the present invention comprises a storage tank which also is used to comminute the incoming septage, and further includes at least three reactor tanks which are connected in series to receive the comminuted output from the storage tank and successively bubble the oxygen-containing fluid through the septage to reach the desired oxygen level. Simultaneously, volatile gases and the residual air are drawn out of the top of each reactor tank, and forwarded to a treatment tank where chlorinated water as an output from the conventional aerobic wastewater treatment facility is trickled downwardly into reaction with the volatile gases through an inert trickle media, to substantially reduce the hydrogen sulfide gas content of those gases. The liquid output of the treatment tank may then be injected back into the head end of the municipal treatment facility together with the aerobic output of the reactor tanks.

DETAILED DESCRIPTION OF THE PREFERRED EMBODIMENT

A preferred form of the system of the present invention will now be described with reference to FIG. 1.

Figure 1:
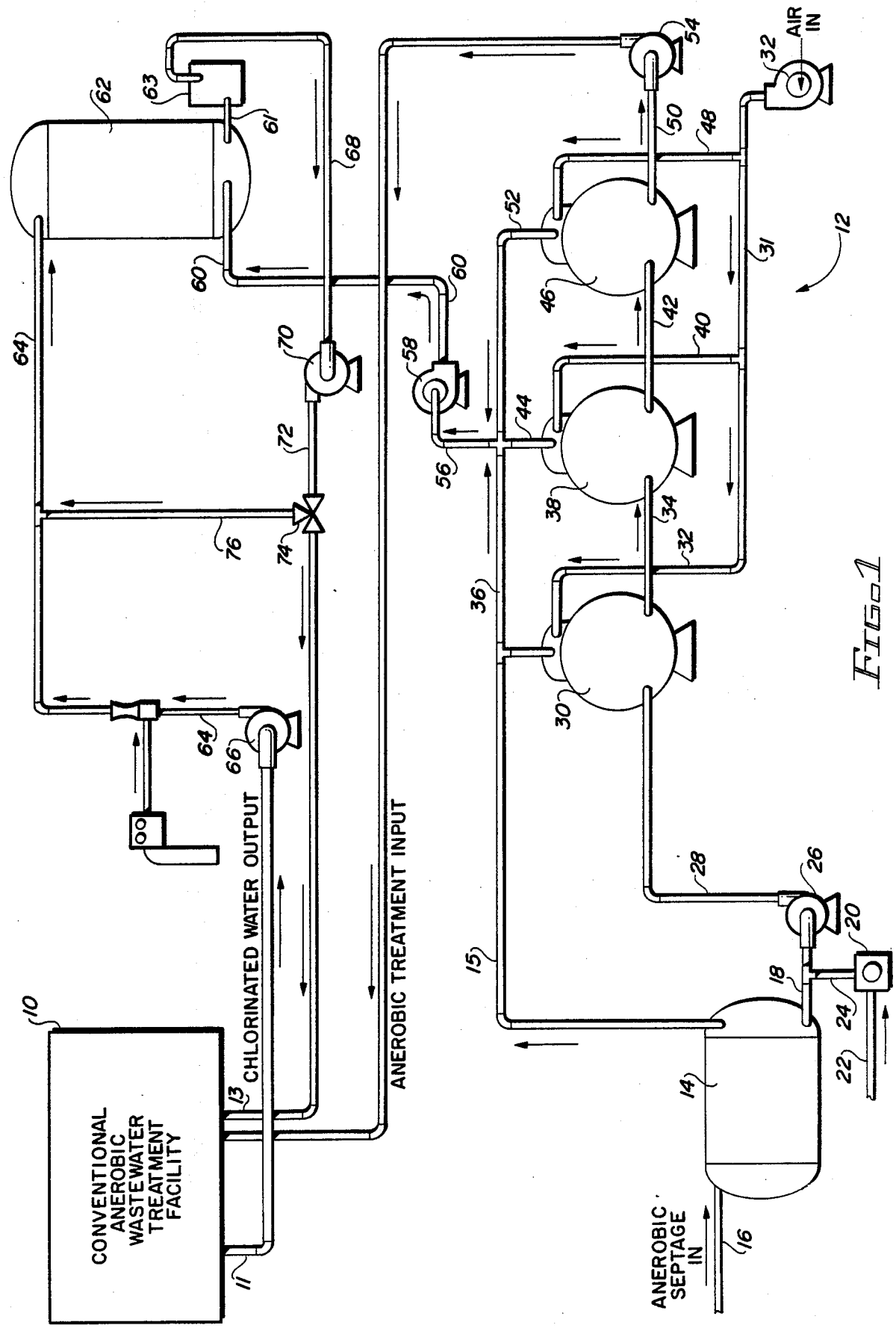
FIG. 1 is a schematic illustration of the system of the present invention, as shown co-located with a conventional aerobic wastewater treatment facility.

In FIG. 1, a conventional aerobic wastewater treatment facility is referred to by the reference numeral 10 and includes input headwater lines 13 and a chlorinated water output 11. It will be appreciated by those skilled in the art that the input to such a municipal wastewater treatment facility is not always in an aerobic condition, but that a principal purpose of the present invention is to avoid inputs of large quantities of raw sewage in a highly anaerobic condition.

In accordance with the present invention, a system, generally referred to by the reference numeral 12, is co-located with the aerobic wastewater treatment facility 10 in order to pre-treat the highly anaerobic septage obtained from septic tanks and similar installations. The system includes a storage tank 14 having an input line 16 for receiving highly anaerobic septage from septic tank haulers and similar sources. The tank is provided with conventional means for grinding and comminuting the raw anaerobic septage input, and has an associated discharge pump 26 connected via an output line 18. The storage tank 18 thus reduces the size of the solids pumped to the reactor tanks 30, 38 and 46. Because of this mixing of the raw septage in the storage tank 14, some volatile gases are generated within the tank 14 and therefore must be exhausted via exhaust line 15 to the volatile gas treatment tank 62, as is described in greater detail below.

Aeration of the anaerobic septage occurs in plural enclosed reactor tanks 30, 38 and 46, each of which has an input air sparger 32, 40 and 48, respectively. As will be described in greater detail below, the reactor tanks 30, 38 and 46 are generally spherical in shape and range in size from about 500 to 2,000 gallons in capacity. Each reactor tank 30, 38 and 46 typically receives air at a rate of about 50 cubic feet per minute, which preferably represents an air volumetric flow rate in cubic feet per minute on the order of about one tenth of the liquid volume of the respective reactor tank. Preferably, about forty percent of the volume of each reactor tank 30, 38 and 46 is provided as free space above the fluid level of the septage to be treated, in order to initiate oxygenation of the volatile gases generated in that free space. The hydraulic retention in each tank 30, 38 and 46 will range between 12 and 30 minutes per tank, for a total of about 36-90 minutes. Retention time may be varied, depending upon the required level of treatment; however, it is preferred to obtain a minimum dissolved oxygen concentration on the order of at least about 2.0 milligrams per liter in the septage being treated, prior to discharge into the head end 13 of the wastewater treatment plant 10.

Figure 2:
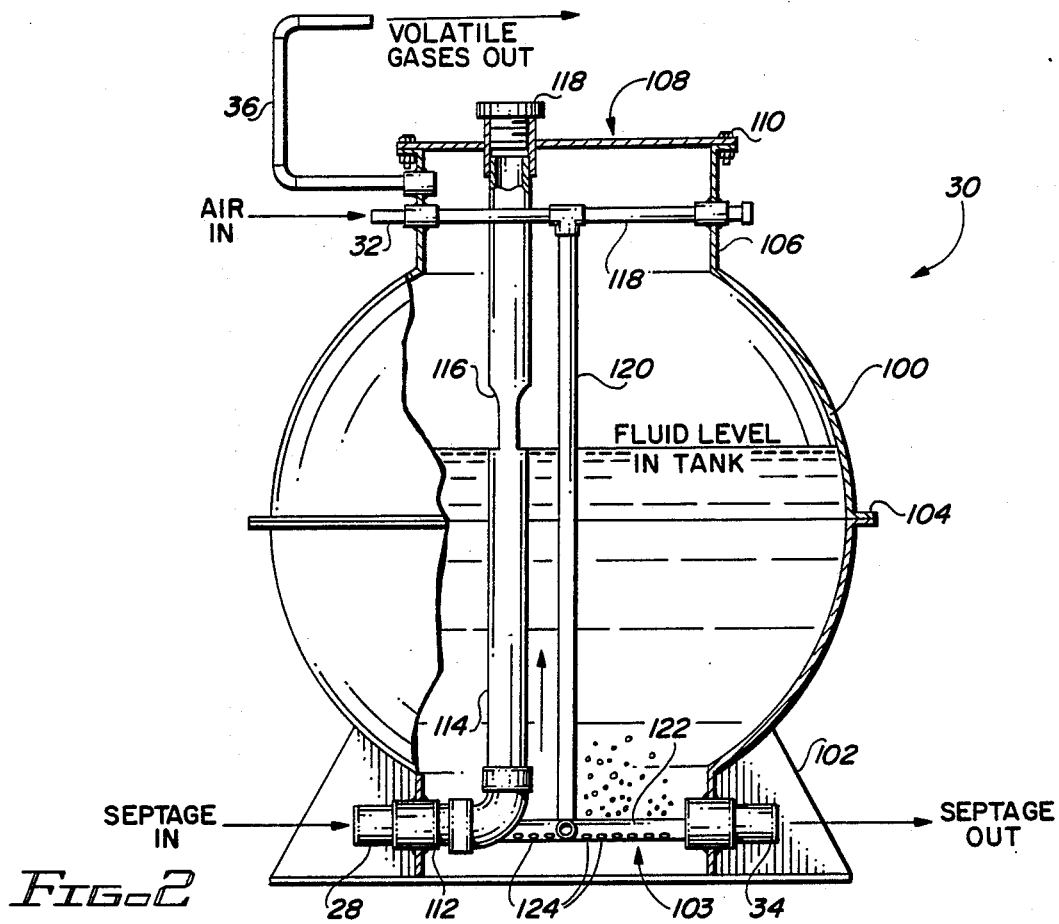
FIG. 2 is an elevation, partially in cross section, of one of the reactor tanks shown in the system of FIG. 1.
Figure 3:
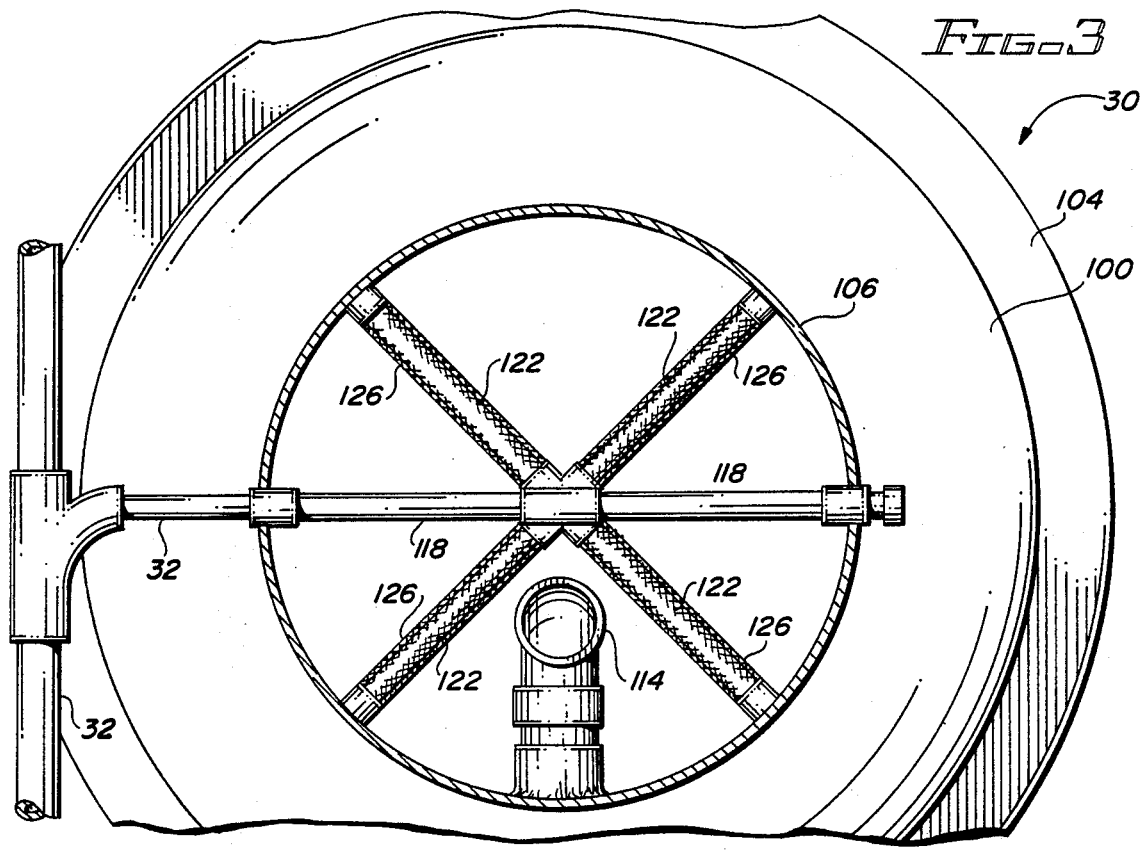
FIGS. 3 and 4 show details of the reactor tank construction of FIG. 2.
Figure 4:
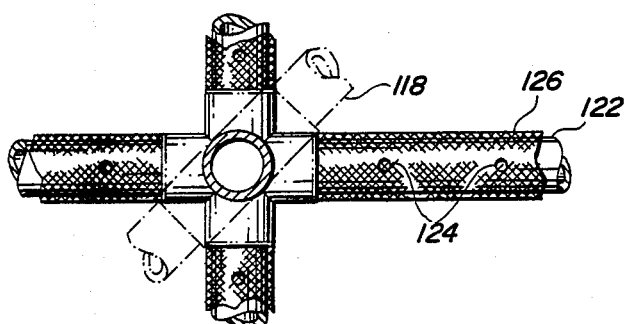

To achieve this objective, each reactor tank is provided with a construction like that shown in FIGS. 2, 3 and 4. Noting FIG. 2, the reactor tank 30 is formed of a spherical tank 100 having a lower cylindrical extension 103 and an upper cylindrical extension 106. The spherical tank 100 is formed of two halves, which are joined together by a flange 104. A cover 108 is provided, and is secured by bolts 110. Supports 102 are provided at the bottom of the tank.

The septage input line 28 receives the comminuted anaerobic septage from the storage tank 14, and passes upwardly into the reactor tank 30 and out of openings 116. The openings 116 thus control the fluid level in the tank 30. A cap member 118 permits access to the vertical standpipe 114 for cleaning purposes. The air sparger 32 passes through the upper cylindrical extension 106 and is fed into a horizontal tube 119, a vertical tube 120, and thence into four air dispersion arms 122 located in the bottom cylindrical extension 103 (note FIG. 2 and 3). Each air dispersion arm 122 has a plurality of openings 124 extending downwardly, and through which the air is bubbled upwardly through the septage located in the reactor tank 30, for purposes of oxygenating that septage. In order to reduce the size of the bubbles emitted from the openings 124 and protect the openings from intrusion of solids contained in the septage, a gas membrane 126 is fitted across each air dispersion arm 122 (note FIGS. 3 and 4).

Referring again to FIG. 1, reactor tank 30 is coupled to a treated septage output line 34, which in turn is coupled to an internal standpipe in reactor tank 38 which is essentially identical to the standpipe 114 shown in FIG. 2. Similarly, a reactor tank 38 is connected to a treated septage output 42, which is in turn coupled to an internal vertical standpipe in reactor tank 46 which is essentially identical to the standpipe 114 of FIG. 2. The output 50 of the last reactor tank (in this case, reactor tank 46) is transmitted via pump 54 to the head end 13 of the municipal wastewater treatment facility 10.

Figure 5:
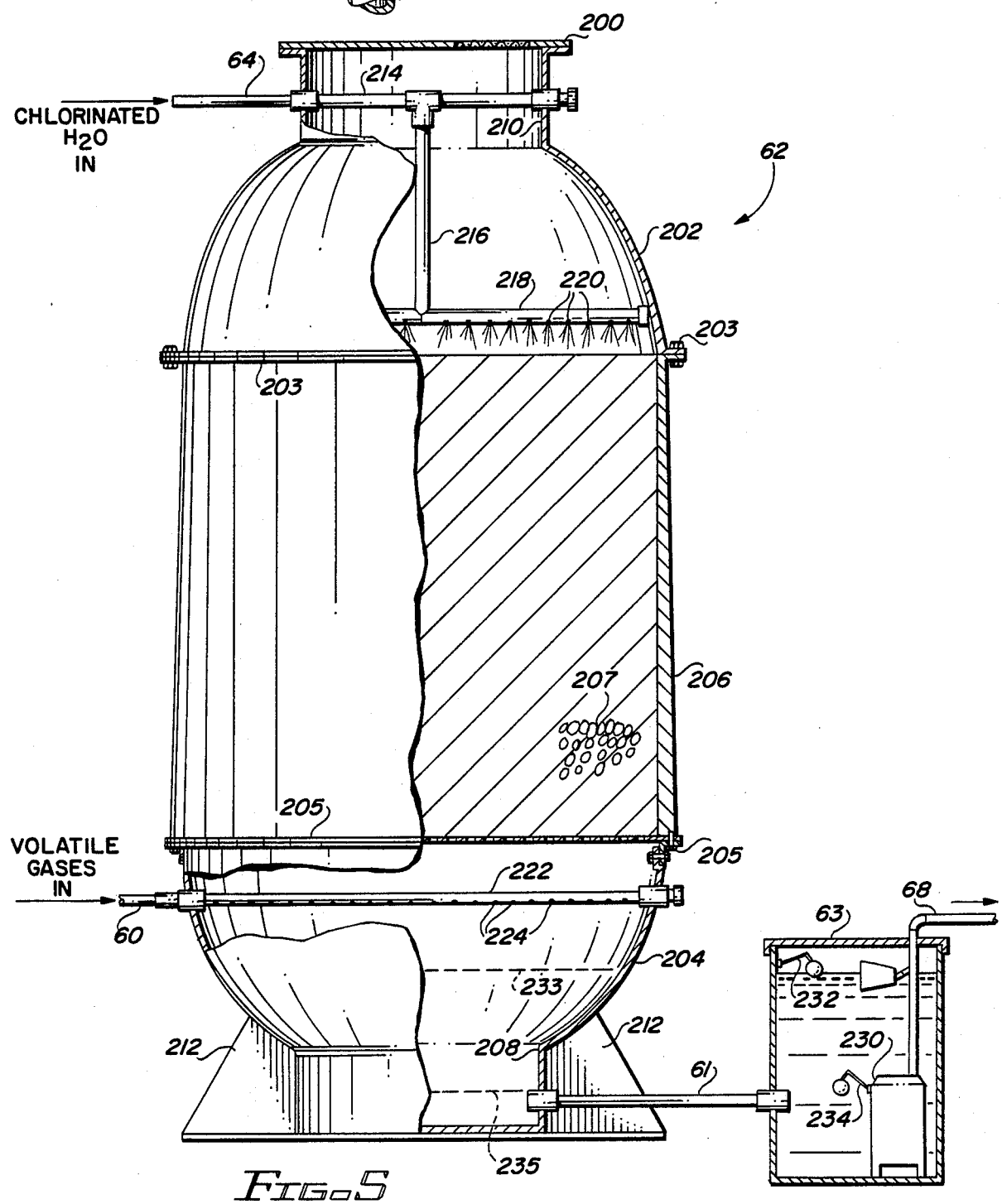
FIG. 5 is an elevation, partially in cross section, of the construction of a treatment tank and sump which forms a part of the system of FIG. 1.

Simultaneously with the treatment of the solids and liquids of the anaerobic septage, the volatile gases are drawn out of the storage tank 14 and out of each reactor tank 30, 38, and 46 via respective lines 15, 36, 44 and 52 into a common line 56 and thence through a pump 58 into a treatment tank 62. The specific construction of the treatment tank and an associated sump 63 is shown in FIG. 5 and described next.

The treatment tank 62 may be formed of hemispheres 202 and 204 which are connected by an intermediate cylindrical section 206 by corresponding flanges 203 and 205. A lower cylindrical extension 208 extends from the lower sphere, and the upper hemisphere 202 is connected to an upper cylindrical extension 210. A cover 209 is provided at the top of the tank, and supports 212 are provided at the tank bottom. Located within the extension 206 is a plurality of inert elements, such as snowflake packing or raschig rings having a diameter on the order of 1.0-3.0 inches and a surface area to volume ratio of 29-58 $ft^2/ft^3$. The treatment tank 62 includes an input water line 214 coupled to the chlorinated water line 64, a vertical extension 216 and horizontal dispersion arm 218 through which holes 220 are provided to disperse the chlorinated water downwardly through the trickle media 207. The volatile gases drawn off of the reactor tanks 30, 38 and 46 are input through the lower hemisphere 204 via a horizontal line 222 and openings 224. As the gas passes upwardly through the trickle media 207, that gas reacts with the chlorinated water trickling downwardly from the top of the treatment tank 62. The oxygen content of the water reacts with the hydrogen sulfide gas and reduces the odor and bacteria level of the volatile gases. The resulting water passes out of the treatment tank 62 via an output line 61 to a sump 63, which is used to control the fluid level in the treatment tank 62. More specifically, the sump 63 is provided with a float valve 232 which is used to insure that the maximum water levels remain at about the dotted line 233 as shown in FIG. 5. Similarly, a lower float valve 234 is used to maintain the minimum water level corresponding to the dotted line 235 in FIG. 5.

Referring once again to FIG. 1, the treated output along line 68 from the sump 63 passes through a pump 70, and thence into the head end 13 of the municipal wastewater treatment facility. Alternatively, as is shown by valve 74, the water may be passed along line 76 back into the top of the treatment tank 62.

It is known that the total volatile acid concentration in septage is on the order of about 37 milligrams per liter, and that the ammonia concentration as nitrogen is on the order of 1,215 milligrams per liter These amounts typically represent approximately 16 percent of the total mass of the waste. The typical acid content is expressed by the following:

| Acid | % Total Acid |
|---|---|
| Butyric | 2.56 |
| Propionic | 3.23 |
| Acetic | 59.31 |
| Formic | 20.84 |
| Lactic | 14.06 |

It is noted that at a pH of 7.5, the predominant ionic species are that of acetate, formate and lactate. The volatile acids that are produced in the anaerobic cycle of digestion within a septic tank slowly forms alcohols in a reductive environment. If oxygen is then supplied to this fluid, the facultative aerobic organism will use these alcohols as a substrate. The significant aspect of this process is the ability to transition the microbial culture from an anaerobic environment to an aerobic environment. The acid reactions with oxygen taking place in the reactor tanks 30, 38 and 46 result in the formation of carbon dioxide and bicarbonate ions, which obtains a 25 percent reduction in oxidizable material in the reactor tanks. These biochemical transformations and oxidation reactions are more fully described in the following references, which are incorporated herein by reference: Gaudy & Gaudy, *Microbiology for Environmental Scientists and Engineers*, McGraw-Hill Company, 1980; Mitchell, R., *Water Pollution Microbiology*, John Wiley - Interscience, Vol. I, 1972, pp. 96–108; Bailey, J. and Ollis, D., *Biochemical Engineering Fundamentals*, McGraw-Hill Company, 1977, p. 250.

It will thus be understood that the present invention provides a system and method for the treatment of highly anaerobic septage collected from septage tanks and similar installations, so as to render that septage generally aerobic and thereby treatable in a conventional aerobic municipal wastewater treatment facility. Simultaneously, the present invention also provides a means for treating the aerobic volatile gases generated in the treatment process and oxidizing those gases.

What is claimed is:

1. A method for treating anaerobic wastewater collected from septic tanks for rendering the anaerobic wastewater suitable for input into a conventional aerobic wastewater treatment facility, the method comprising the steps of:
   placing the anaerobic wastewater into a reactor tank;
   treating the anaerobic wastewater with an oxygen-containing fluid while in the reactor tank so as to substantially increase the dissolved oxygen content in the wastewater and thereby render the wastewater aerobic;
   drawing off volatile gases from the reactor tank and placing the gases in a treatment tank;
   treating the volatile gases to reduce the bacterial and odor level; and
   pumping the converted aerobic wastewater into the head end of an aerobic wastewater treatment facility.

2. The method recited in claim 1 further comprising the step of locating the reactor and treatment tanks next adjacent the aerobic wastewater treatment facility.

3. The method recited in claim 2 wherein the volatile gas treating step comprises passing the volatile gases through a trickle media and contacting the gases with chlorine-containing water.

4. The method recited in claim 3 wherein the chlorine-containing water comprises an output of the aerobic wastewater treatment facility.

5. The method recited in claim 1 further comprising the step of comminuting the anaerobic wastewater before the step of placing the wastewater in the reactor tank.

6. The method recited in claim 1 further comprising the step of raising the oxygen content of the anaerobic wastewater to on the order of about 2.0 milligrams per liter during the oxygen-containing fluid treating step.

7. The method recited in claim 1 wherein the oxygen-containing fluid treating step comprises diffusing an oxygen-containing gas through a gas membrane.

8. The method recited in claim 1 wherein the volatile gases treating steps comprises:
   placing an inert media in the treatment tank, the inert media comprising a multiplicity of elements defining small voids between adjacent elements;
   injecting the volatile gases at the bottom of the treatment tank, so that the gases rise through the inert media; and
   trickling chlorine-containing water from the top of the treatment tank and through the inert media, so as to treat the volatile gases in the small voids between the inert elements.

9. The method recited in claim 8 wherein the volatile gases includes hydrogen sulfide gas, and wherein the volatile gases treating step further comprises the steps of:
   mixing the volatile gases in the treatment tank with an oxygen-containing fluid, thereby facilitating a reaction between the hydrogen sulfide gas and oxygen and obtaining water and sulphur from that reaction; and
   passing the water from that reaction to the head end of the aerobic wastewater treatment facility.

10. A method for treating anaerobic wastewater collected from septic tanks for rendering the anaerobic wastewater suitable for input into a conventional aerobic wastewater treatment facility, the method comprising the steps of:
    placing the anaerobic wastewater into a reactor tank;
    treating the anaerobic wastewater with an oxygen-containing fluid while in the reactor tank so as to substantially increase the dissolved oxygen content in the wastewater and thereby render the wastewater aerobic;
    pumping the converted aerobic wastewater into the head end of an aerobic wastewater treatment facility;
    drawing off volatile gases from the reactor tank and placing the gases in a treatment tank;
    treating the volatile gases with chlorine-containing water from the aerobic wastewater treatment facility; and
    pumping the chlorine-containing water used for treatment of the volatile gases back into the aerobic wastewater treatment facility.

11. The method recited in claim 10 wherein the volatile gas treating step comprises passing the volatile gases through a trickle media and contacting the gases with the chlorine-containing water.

12. The method recited in claim 10 wherein the volatile gas treating step comprises:
    placing an inert media in the treatment tank, the inert media comprising a multiplicity of elements defining small voids between adjacent elements;
    injecting the volatile gases at the bottom of the treatment tank, so that the gases rise through the inert media; and
    trickling the chlorine-containing water from the top of the treatment and through the inert media, so as to treat the volatile gases in the small voids between the inert elements.

13. The method recited in claim 10 wherein the oxygen content for the anaerobic wastewater is raised to a level on the order of about 2 milligrams per liter.

* * * * *